May 5, 1959    J. E. MOORE    2,885,250
AUTOMOBILE SERVICE TRAY
Filed Jan. 31, 1958    2 Sheets-Sheet 1
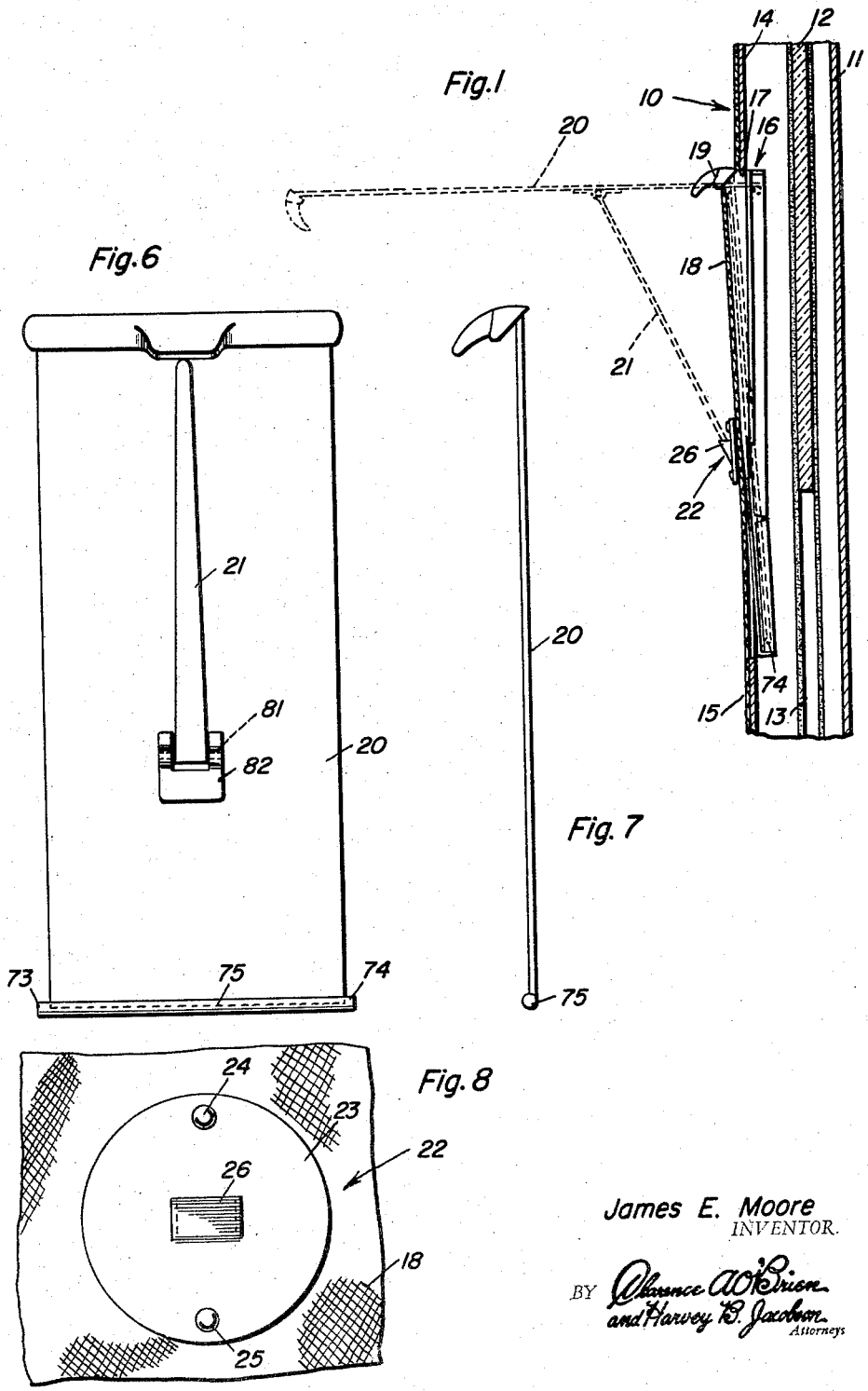
James E. Moore
INVENTOR.

May 5, 1959 J. E. MOORE 2,885,250
AUTOMOBILE SERVICE TRAY
Filed Jan. 31, 1958 2 Sheets-Sheet 2
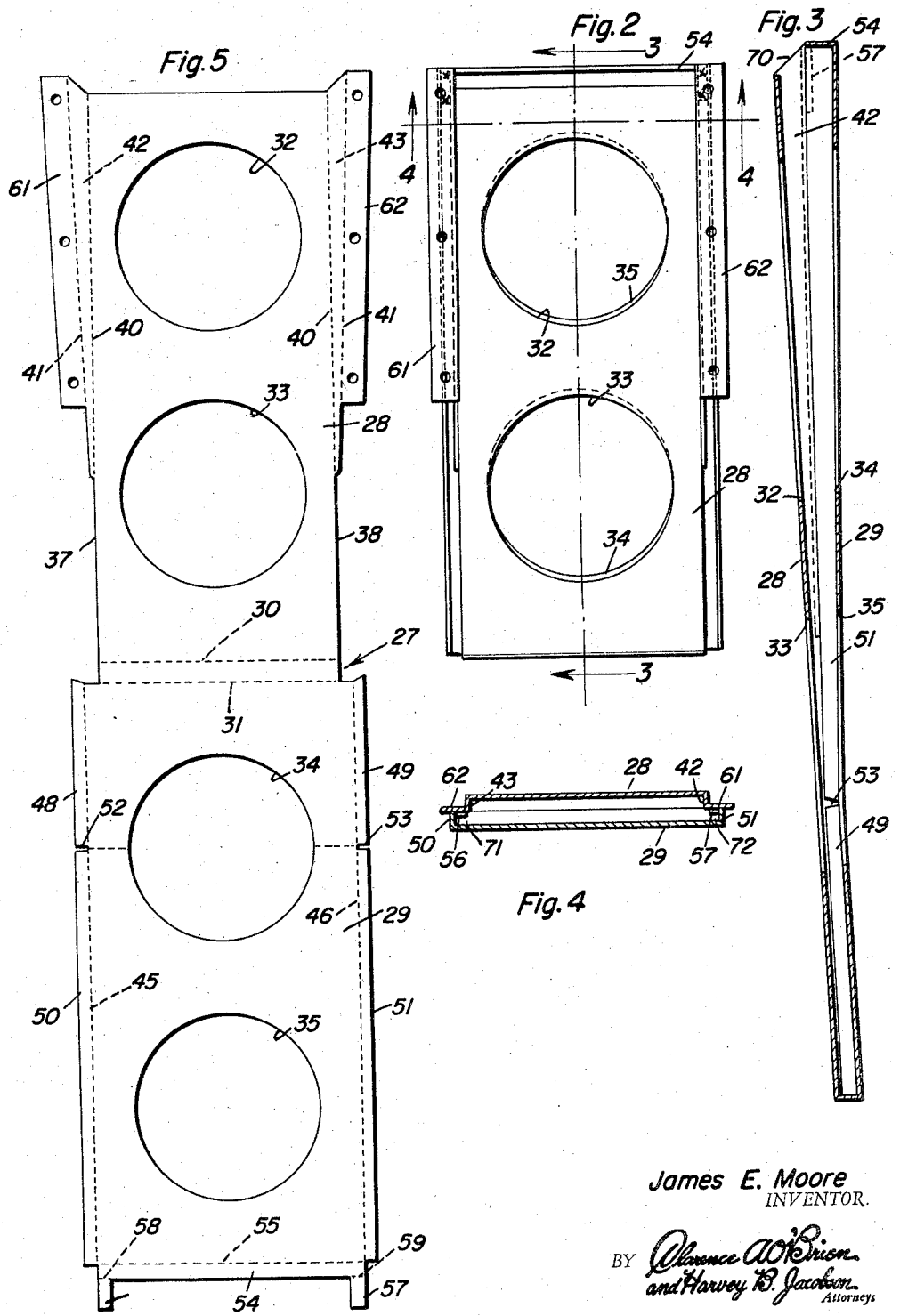
James E. Moore
INVENTOR.

United States Patent Office 2,885,250
Patented May 5, 1959

2,885,250

AUTOMOBILE SERVICE TRAY

James E. Moore, Louisville, Ky.

Application January 31, 1958, Serial No. 712,452

2 Claims. (Cl. 311—21)

This invention relates in general to automotive accessories and pertains more particularly to a service tray for use by the occupants of a motor vehicle.

At the present time, drive-in eating establishments have gained substantial popularity but there is an attendant disadvantage in utilizing the services of such an establishment. Namely, the foodstuffs and beverages are delivered to the automobile or motor vehicle on a single tray which is suspended from one of the vehicle doors at the window opening thereof. Usually, the tray is hung on the driver's side. If there are other occupants of the vehicle, it is annoying and often difficult to handle the beverages and foodstuffs due to the lack of any supporting surface upon which the articles may be placed. Consequently, particularly with children, beverages and food are often spilled on the upholstery or floor of the vehicle. It is therefore of primary concern in connection with this invention to provide an automobile service tray which is disposed in the interior of a motor vehicle and at a convenient location or locations therein so as to enable the various occupants of the vehicle to have access to a supporting surface or tray upon which articles may be placed, particularly useful in conjunction with supporting foodstuffs and beverages at a drive-in restaurant or the like.

Another object of this invention is to provide an automobile service tray assembly for use in motor vehicles and which is adapted to be disposed in concealed relationship therein so as to avoid detracting from the appearance of the vehicle.

Another object of this invention is to provide an automobile service tray of the character described in which the assembly comprises an envelope normally serving to hold and conceal the tray and being so constructed as to permit the tray to be withdrawn therefrom and disposed in a substantially horizontal article supporting position.

Another object of this invention is to provide an automobile service tray assembly including an envelope member having an open top and adapted to be placed behind the upholstery in an automobile or the like and containing an elongate tray member which is adapted to be pulled substantially completely out of the envelope so as to assume a horizontal position with the lower or inner end thereof remaining connected to the envelope and with the underside of the tray being provided with a brace element so as to cooperate with the envelope in holding the tray in the horizontal position.

Still another object of this invention is to provide an improved assembly of the character described which is of simple and economical manufacture and wherein the envelope is so constructed as to provide internal guide rails therein for positioning the tray within the envelope and which also serve to hold the inner end of the tray in position when the tray is disposed in the horizontal position.

A further object of this invention is to provide an automobile service tray assembly comprising an envelope providing an open top pocket and adapted to be concealed behind the upholstery in an automobile or the like and which is adapted to normally contain an enlongate tray element therewithin, the upper end of the tray being disposed at the open top of the envelope and having a laterally projecting lip or flange thereon which may be suitably decorated to lend a pleasing appearance to and to blend with the interior motif of the vehicle and also serving as a hand-grip element for permitting the tray to be pulled outwardly through the open top of the envelope with the inner end of the tray remaining attached to the envelope so as to be supported in a horizontal position.

These together with other objects and advantages which will become subsequently apparent reside in the details of construction and operation as more fully hereinafter described and claimed, reference being had to the accompanying drawings forming a part thereof, wherein like numerals refer to like parts throughout, and in which:

Figure 1 is a vertical section taken through the door of an automobile and showing the manner in which the service tray is mounted on the interior thereof and behind the upholstery and showing, in dotted lines, the operative position of the tray assembly;

Figure 2 is a plan view of the envelope assembly and showing the same in completed form;

Figure 3 is an enlarged vertical section taken substantially along the plane of section line 3—3 of Figure 2 and showing details of the internal construction of the envelope assembly;

Figure 4 is a horizontal section taken substantially along the plane of section line 4—4 in Figure 2 and illustrating the details of construction of the envelope and also serving to illustrate the construction of the guide rail assemblies;

Figure 5 is a plan view of the blank for the envelope assembly before being bent into completed position and secured together;

Figure 6 is a plan view of the tray;

Figure 7 is a side elevational view of the tray assembly; and

Figure 8 is an elevational view of the mounting pocket for the supporting brace of the tray.

Referring now more particularly to Figure 1, the reference numeral 10 indicates in general a cross-section through the door of an automotive vehicle, the reference numeral 11 indicating the exterior body panel of the door, the reference character 12 indicating the window glass slidable in the track elements 13 mounted interiorly of the door and the reference character 14 indicating the inner body panel of the door assembly. The inner panel 14 is provided with a cover of upholstery 15 and the automobile service tray assembly indicated generally by the reference characters 16 is so mounted within the door as to be substantially completely concealed by the upholstery 15, as will be readily apparent in Figure 1.

For this purpose, the inner body panel 14 is cut-away as indicated by the reference character 17 and the service tray assembly 16 placed in position therewithin and with the inner face of the tray assembly providing a support for the upholstery portion 18 which is subsequently adhered thereto as by the usual adhesive means or the like leaving only a narrow opening through which the handgrip flange 19 of the assembly 16 normally projects when the service tray is in the concealed or inoperative position. Figure 1 also serves to illustrate, in dotted lines, the operative position of the tray assemblage and in this figure, it will be noted that the tray 20, when disposed in the withdrawal position, will be disposed substantially horizontally and is provided with a brace leg 21 extending angularly downwardly from the undersurface thereof for reception within the support pocket assembly indicated generally by the reference character 22.

Figure 8 illustrates the construction of the supporting pocket assembly 22 and, in this figure, it will be appreciated that this assembly consists essentially of a base plate element 23 suitably fastened as by rivets 24 and 25 to the service tray assembly and on the inner side of the upholstery portion 18 covering the assembly. Provided on this base plate 23 is an upwardly facing cup 26 which is adapted to receive the lower end of the brace leg 21 therein when the tray is in the operative position as shown in dotted lines in Figure 1.

The assembly includes the aforementioned tray 20 and an envelope defining a pocket for normally receiving and concealing the tray therewithin. This envelope is formed from a blank as is shown in Figure 5, such blank being indicated by the reference character 27. The blank is provided with upper and lower main body portions 28 and 29 which are folded upon each other across the transverse fold lines 30 and 31 disposed substantially medially of the blank and are preferably provided with large cut-out portions 32, 33, 34 and 35 therein so as to reduce the over-all weight thereof. The lower section 29 forms the outer side of the envelope whereas the upper portion 28 forms the inner side thereof and against which the upholstery portion 18 is secured. The upper portion 28 has its lower side edge portions 37 and 38 of uniform dimensions, that is being parallel to each other, while the portions at the opposite side edges thereof above such edge portions 37 and 38 project, in the blank, laterally outwardly thereof and are adapted to be folded along the upwardly divergent fold lines 40 and 41 at each side of the blank. The fold lines 40 effect continuations of the lower edge portions 37 and 38 whereas the upwardly divergent fold lines 41 provide triangular side edge portions 42 and 43 providing a constantly enlarging open end or mouth for the envelope. The lower portion 29 is provided with longitudinally extending fold lines 45 and 46 adjacent the opposite side edges thereof and being offset laterally outwardly of the corresponding edges 37 and 38 in the upper portion 28 and providing the side flap portions 48, 49, 50 and 51, in conjunction with the transverse slits 52 and 53 which are bent rearwardly at right angles to the portion 29 and are adapted to engage, edgewise, against the corresponding inner surface of the upper portion 28, as will be seen most clearly in Figure 3.

The free end of the lower section 29 is provided with an end tab 54 by virtue of the transverse fold line 55 and is also provided with the finger-like extensions 56 and 57 folded across the lines 58 and 59 and which are adapted to abut against the faces of the outside flanges 61 and 62 provided by the upwardly divergent fold lines 41 on the upper section 28. The slits 52 and 53 compensate for the flaring upper end of the envelope providing the enlarged mouth or open end 70 at the upper end thereof.

Due to the offset relationship of the fold lines 45 and 46 laterally outwardly of the corresponding edges 37 and 38 and the continuations thereof as provided by the fold lines 40, the guide rails or channels 71 and 72 are provided in the opposite sides of the envelope and these are adapted to receive the opposite free end portions 73 and 74 of the cross bar 75 which is attached rigidly to the lower end of the tray panel 20. Thus, the cross bar 75 serves to guide the tray within the pocket and also the opposite ends 73 and 74 thereof provide abutment stops preventing the complete withdrawal of the tray from the pocket, the flange portion 54 also serving to effect this relationship and preventing withdrawal of the tray through the continuation or top of the guide rails 71 and 72.

The brace 21 is affixed to the tray panel by means of a pintle pin 80 carried by the hinge bracket 82 which is rigid with the tray panel and so that the brace is free to hinge with respect to the tray so as to be disposed in the position shown in Figure 6 which is the out-of-the-way position when the tray is stored and the operative position shown in Figure 1 which is utilized when the tray is disposed in the horizontal operative position.

It will be appreciated that the tray assembly may be positioned at any convenient point within a vehicle and so as to provide accessibility for any one or several of the occupants of a vehicle. For example, one tray may be provided in each door of the vehicle or on the rear of the front seat or at any convenient point at which it would be desirable to have such a tray assembly.

What is claimed as new is as follows:

1. A vehicle service tray assembly adapted to be mounted in a vehicle in substantially concealed relationship therewithin, said assembly comprising an envelope defining a pocket having an open mouth at its upper end and a tray received within the pocket in said envelope and projectible through the mouth thereof, said envelope including inner and outer side portions joined together and disposed in spaced relationship to define the pocket and with portions of the inner side being laterally outwardly offset with respect to the outer side to define guide channels along the opposite sides of the envelope, said tray having lateral projections at the lower end thereof received in said guide channels, an end tab at the upper edge of said inner side extending horizontally therefrom towards said outer side to partially close said mouth and forming a cover over the upper ends of said guide channels preventing complete withdrawal of the tray from the envelope, the upper edge of said outer side being below the level of said end tab to permit positioning of said tray in horizontally extending relation from the mouth of said pocket, and a brace leg pivoted to the undersurface of said tray for supporting the same in horizontal position with respect to the envelope.

2. The assembly as defined in and by claim 1 including a base plate secured to said outer side portion, an upwardly facing cup fixed to said base plate for receiving the lower end of said brace leg when the tray is in its horizontal position.

References Cited in the file of this patent

UNITED STATES PATENTS

| | | |
|---|---|---|
| 1,348,613 | Wills | Aug. 3, 1920 |
| 1,780,706 | Goldbecher | Nov. 4, 1930 |
| 1,965,788 | Akiyoshi | July 10, 1934 |
| 2,098,426 | McDonald | Nov. 9, 1937 |
| 2,585,742 | Condon | Feb. 12, 1952 |
| 2,619,395 | Kent | Nov. 25, 1952 |
| 2,693,774 | Prima | Mar. 30, 1954 |
| 2,723,887 | Kowalsky | Nov. 15, 1955 |